Patented Sept. 29, 1942

2,297,272

UNITED STATES PATENT OFFICE 2,297,272

TOXIFERINE, THE ACTIVE PRINCIPLE OF CALABASH-CURARE, AND METHOD OF PURIFYING THE SAME

Heinrich Wieland, Munich, and Wilhelm Konz, Nieder-Ingelheim-on - the - Rhine, Germany; vested in the Alien Property Custodian No Drawing. Application January 13, 1938, Serial No. 184,906. In Germany January 14, 1937

7 Claims. (Cl. 260—236)

The present invention relates to toxiferine contained in calabash-curare and to a method of purifying the same.

The South American arrow poison curare is put on the market in various forms. The best known and most active modification of curare is the so-called calabash-curare. This is not meant to convey the idea that calabash-curare contains a high percentage of the active principle. On the contrary, exceedingly small amounts only of the active principle are contained in calabash-curare. The remainder consists of inert substances accompanying the toxiferine, and of decomposition products of the active substances which have become inactive.

The present invention relates to the active principle of calabash-curare which has been named toxiferine and which forms a well-defined anthraquinone-$\beta$-sulfonate. Crystallization of toxiferine anthraquinone-$\beta$-sulfonate from hot aqueous alcohol yields light yellow needles melting at ca. 278° C. with decomposition.

A compound which crystallizes in long yellow needles is also obtained on adding picric acid to toxiferine. Toxiferine picrate has not a sharp melting point, but upon heating at above 300° C. begins to decompose.

Irrespective of the acid residue to which it is attached toxiferine with a mixture of bichromate and sulfuric acid yields a deep dark blue color reaction which gradually fades, passing through red-violet and reddish. Further, toxiferine with concentrated nitric acid strikes a green color which quickly decreases in intensity.

The physiological activity of toxiferine is about ten times that of the best preparations described hitherto. In experiments on animals, the paralysing dose of toxiferine anthraquinone-$\beta$-sulfonate amounts to .04 mg. per 1 kg. of frog. Toxiferine hydrochloride which has not yet been obtained as a crystalline product, is still more active. As little as .03 mg. of toxiferine hydrochloride is the paralysing dose per 1 kg. of frog.

As therapeutic agents, the anthraquinone-$\beta$-sulfonate and other water soluble salts of toxiferine can be employed.

A structural formula of toxiferine cannot yet be given. However, investigation of pure toxiferine has shown that the active principle of calabash-curare is a quaternary ammonium compound, as had formerly been supposed.

The aqueous solution of toxiferine has an exceedingly bitter taste.

Another feature of the invention is to provide a method of purifying the active principle contained in calabash-curare. The working up of calabash-curare meets with difficulties owing to the fact that prolonged action of an excess of mineral acid is apt to decompose the active principle of calabash-curare. Care must therefore be taken not to acidify, for any length of time, solutions containing the active principle of calabash-curare as shown by a dark coloration of the solution.

The purification of calabash-curare is effected in several steps. A practical method of carrying out the purification will hereinafter be described in detail:

The parent solution which has been obtained by extracting calabash-curare with methyl alcohol, evaporating of the methyl alcohol, and taking up the residue with water, is subjected to a preliminary purification by precipitation with mercuric chloride. The precipitate is suspended in alcohol and decomposed with hydrogen sulfide at ca. 50° to 60° C.

Another way of effecting the preliminary purification of the parent solution consists in fractional precipitation with ethanol or methanol. The aqueous solution of the active principle of calabash-curare, after being subjected to either of the aforementioned preliminary purification methods, is then transformed into the Reineckate of calabash-curare by adding Reinecke's salt, i. e., [tetrathiocyanato-di-ammino-chromi]-ammonium.

Another very important step in the purification of calabash-curare consists in treating the dilute acetonic solution of the Reineckate of calabash-curare with neutral adsorbents, particularly with aluminium oxide. This purification by adsorption is effected on the lines of chromatographic analysis (cf. G. Hesse's report in Angew. Chem. 49, p. 315–320, 1936), i. e., by filtering the dilute acetonic solution of the Reineckate of calabash-curare through a column of the adsorbent. In order further to illustrate this step of the method it may be stated that the acetonic solution of the Reineckate of calabash-curare containing, for example, 2.7 g. of Reineckate of calabash-curare in 800 cc. of acetone is filtered through a column of 100 g. of aluminium oxide. The bulk of the impurities present is thereby fixed by the adsorbent. In order to displace the solution of the Reineckate of calabash-curare, the adsorptive column is subsequently washed with pure acetone.

After concentrating the highly colored filtrate by evaporation in vacuo, dilute hydrochloric acid is added, and the Reinecke acid is removed by extraction with ether. The aqueous solution of the hydrochloride of calabash-curare which remains is evaporated to dryness in vacuo. The hydrochlorides of calabash-curare thus obtained are taken up with ethyl alcohol and/or acetone the solution being preferably adjusted to concentration of ca. 5 to 10%. To this solution 40 times the amount of ether is added, the bulk of the substance contained in the solution being precipitated as a dark brown mass which becomes greasy. This mass consists of the substances accompanying the toxiferine, whereas the toxiferine itself remains in solution. By adding now further quantities of ether, ca. 13 parts, to the solution, a lighter colored intermediate fraction is obtained which, however, still consists essentially of the substances accompanying the toxiferine. Owing to these precipitations, the solution itself has become practically decolorized, now merely retaining a light yellow shade.

This light yellow ethereal solution is carefully evaporated to dryness. The residue is dissolved in a small amount of water, and a cold saturated aqueous-alcoholic solution of sodium anthraquinone-$\beta$-sulfonate is added thereto till a strong cloudiness is produced. Then the whole is heated till a clear solution is obtained. The warm solution is slowly cooled. After a certain time, crystals in the form of light yellow needles will separate which have a completely uniform appearance when viewed under the microscope. The toxiferine anthraquinone-$\beta$-sulfonate can be recrystallized by dissolving in hot alcohol to which an equal amount of water has been added drop by drop. The pure toxiferine anthraquinone-$\beta$-sulfonate thus obtained melts at 278° C.

The fractions precipitated according to the above described method may be re-treated in the same manner, if desired. Certain quantities of toxiferine which have been carried down with the above mentioned precipitates, will thus be obtained and can be transformed into pure toxiferine anthraquinone-$\beta$-sulfonate.

The individual steps of the new method of purifying the active principle of calabash-curare may be modified. For the fractional precipitation, for example, mineral acid salts other than the hydrochlorides can be used; similarly, the solvents employed can be varied. All these modifications come within the scope of the present invention, the essential steps of the process of preparing pure toxiferine being the following:

1. Treatment of the Reineckate of calabash-curare, which has been obtained from the previously purified crude solutions, with suitable neutral adsorbents, particularly with aluminium oxide, according to a method on the lines of chromatographic analysis.

2. Transformation of the purified solutions of the Reineckate of calabash-curare into a mineral acid salt, particularly the hydrochloride, of calabash-curare, and fractional precipitation of the alcoholic and/or acetonic solutions of the mineral acid salts of calabash-curare by adding an excess of ether.

3. Reaction of the mineral acid salts of toxiferine which have been essentially purified by the said fractional precipitation, with salts of anthraquinone-$\beta$-sulfonic acid, and crystallization or recrystallization, respectively, of the toxiferine anthraquinone-$\beta$-sulfonate.

The above described method of purifying toxiferine may also be employed directly in working up the vegetable substances from which curare is obtained.

What we claim is:

1. Toxiferine anthraquinone-$\beta$-sulfonate which crystallizes in yellow needles and melts at 278° C.

2. A method of purifying toxiferine which comprises the steps of producing the [tetrathiocyanato-diammino-chromi] -salt of calabash-curare; dissolving said substance in acetone; causing neutral adsorbents to act on the dilute acetonic solution of the [tetrathiocyanato-diammino-chromi] -salt of calabash-curare; evaporating the acetonic solution of the [tetrathiocyanato-diammino-chromi] -salt of calabash-curare after said solution, by adsorption, has been freed from the substances accompanying the toxiferine; decomposing the said compound by adding a mineral acid; removing the [tetrathiocyanato-diammino- chromi] -acid by extraction with ether; subsequently effecting fractional precipitation of the solution of the mineral acid salts in organic solvents by adding ether; adding anthraquinone-$\beta$-sulfonates and crystallizing the toxiferine anthraquinone-$\beta$-sulfonate thus obtained.

3. A method according to claim 2 which comprises causing the adsorbent to act on the dilute acetonic solution of the [tetracyanato-diammino-chromi] -salt of calabash-curare on the lines of chromatographic analysis, by filtering the dilute acetonic solution through a high column of the adsorbent, and afterwards displacing the said acetonic solution by washing with pure acetone.

4. A method according to claim 2 which comprises using, for the production of the [tetrathiocyanato-diammino-chromi] -salt of calabash-curare, a solution of the active constituents of calabash-curare, said solution having previously been purified by precipitation with mercuric chloride and subsequent decomposition of the mercuric salts with hydrogen sulfide.

5. A method of purifying toxiferine comprising the step of purifying toxiferine anthraquinone-$\beta$-sulfonate by recrystallization from alcohol to which water has been added.

6. A method of purifying toxiferine which comprises the steps of producing the (tetrathiocyanato-diammino-chromi)-salt of calabash-curare; dissolving said substance in acetone; causing aluminium oxide to act on the dilute acetonic solution of the (tetrathiocyanato-diammino-chromi)-salt of calabash-curare; evaporating the acetonic solution of the tetrathiocyanato-diammino-chromi)-salt of calabash-curare after said solution, by adsorption, has been freed from the substances accompanying the toxiferine; decomposing said compound by adding a mineral acid; removing the (tetrathiocyanato-diammino-chromi)-acid by extraction with ether; subsequently effecting fractional precipitation of the solution of the mineral acid salts in organic solvents by adding ether; adding anthraquinone-beta-sulfonates and crystallizing the toxiferine anthraquinone-beta-sulfonate thus obtained.

7. A method according to claim 2, which comprises using for the production of the tetrathiocyanato-diammino-chromi-salt of calabash-curare, a solution of the active substances of calabash-curare, said solution having previously been purified by fractional precipitation of the impurities with alcohol from aqueous solutions.

HEINRICH WIELAND.
WILHELM KONZ.